United States Patent [19]

Huetter et al.

[11] Patent Number: 4,786,201

[45] Date of Patent: Nov. 22, 1988

[54] MOUNTING SYSTEM FOR SECURING MODULES TO ONE ANOTHER

[75] Inventors: Horst Huetter, Tegernsee; Helga Kreupl, Ottobrunn, both of Fed. Rep. of Germany

[73] Assignee: Messerschmitt-Boelkow-Blohm GmbH, Munich, Fed. Rep. of Germany

[21] Appl. No.: 115,432

[22] Filed: Oct. 30, 1987

[30] Foreign Application Priority Data

Dec. 3, 1986 [DE] Fed. Rep. of Germany ....... 3641290

[51] Int. Cl.$^4$ .............................................. B25G 3/00
[52] U.S. Cl. ........................................ 403/22; 403/44; 411/389; 52/127.12
[58] Field of Search ................... 403/296, 43, 44, 45, 403/46, 47, 402, 22; 52/127.12; 411/389

[56] References Cited

U.S. PATENT DOCUMENTS

| 197,721 | 12/1877 | Cornell | 411/389 X |
| 313,193 | 3/1885 | Gaylord | 411/389 X |
| 4,033,393 | 7/1977 | Bedi | 411/930 X |

FOREIGN PATENT DOCUMENTS

| 109797 | 2/1944 | Sweden | 403/402 |
| 21412 | of 1900 | United Kingdom | 411/389 |

Primary Examiner—Andrew V. Kundrat
Attorney, Agent, or Firm—W. G. Fasse; D. H. Kane, Jr.

[57] ABSTRACT

Modular units are connected to each other with the aid of recesses provided in the edges of the modular units and with the aid of clamping bolts each carrying two nuts and a clamping nut in a mirror-symmetrical arrangement relative to a plane passing centrally through the clamping nut and perpendicularly to the longitudinal axis of the clamping bolt. The recesses are correspondingly dimensioned and located so that two sets of recesses in a mirror-symmetrical arrangement can receive the clamping bolt with its nuts. A clamping bolt has oppositely threaded ends so that the rotation of the bolt in one direciton tightens both nuts and rotation in the opposite directions loosens the nuts.

7 Claims, 2 Drawing Sheets 4,786,201

MOUNTING SYSTEM FOR SECURING MODULES TO ONE ANOTHER

FIELD OF THE INVENTION

The invention relates to a mounting system for securing modular units or so-called modules to one another. The modules may be arranged in rows and columns for connection to one another and also in different layers.

DESCRIPTION OF THE PRIOR ART

Mounting systems of the above type are known in the art in different modifications. Depending on the type of modules to be interconnected, such known systems comprise a frame structure and a plurality of plug-in elements, as well as interconnecting screw elements. Other systems comprise modular units which themselves are constructed as plugs or sockets for interconnnection with the plugs. The so interconnected plugs and sockets may then be held together by different types of straps, nuts, and bolts, and the like. It is common to all prior art systems that they require a substantial technical effort and expense for the individual interconnecting elements and for a plurality of different mounting tools.

OBJECTS OF THE INVENTION

In view of the foregoing it is the aim of the invention to achieve the following objects singly or in combination:

to provide a mounting system for securing modular units to one another in an economical and efficient way by means of a single connecting element suitable for all types of connections;

to construct the connecting element in such a way that a single tool can be used for securing any number of modular units to each other to form a compact assembly; and to make sure that an assembly may be changed or modified in any desired manner at any time with one tool type.

SUMMARY OF THE INVENTION

The mounting system for modular units according to the invention is characterized in that each modular unit has along at least certain of its lateral edges, connecting recess means which are so arranged that the recesses of one modular unit match up with the recesses of a neighboring modular unit, each recess having such a dimension and shape that two neighboring recesses can hold and center a self-locking rapid clamping device received in two neighboring recesses and functioning as a connecting element which applies a clamping force to the modular units. The main advantage of the ivnention is seen in that all the connecting recess means have the same shape and configuration. Further, all the self-locking rapid clamping devices used for a particular type of modular unit have the same dimensions corresponding to the dimensions of the respective recesses. A single wrench, such as an engineer's wrench,is sufficient to tighten or loosen all the rapid clamping devices of an assembly of modular units.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
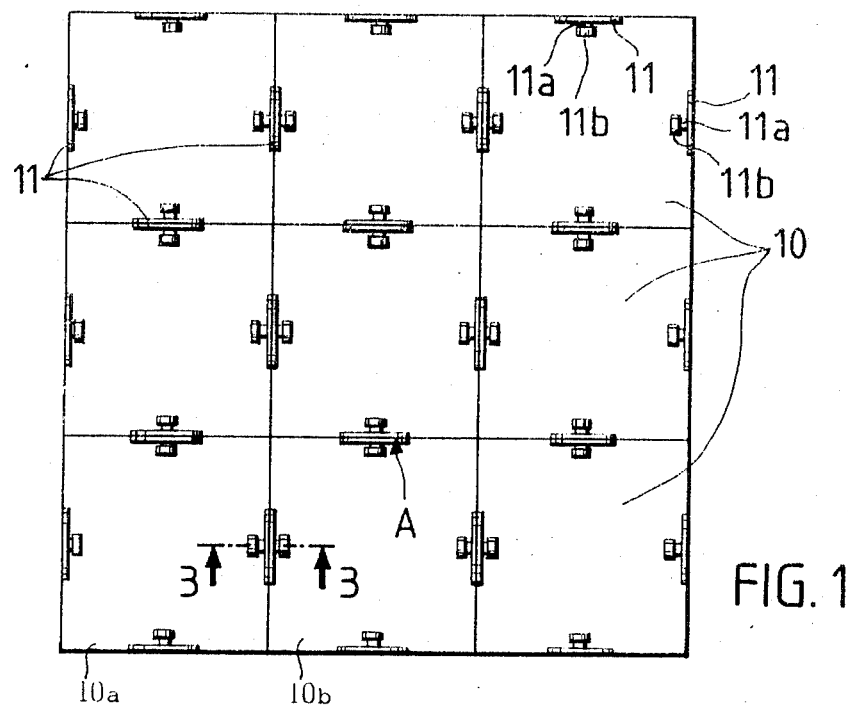
FIG. 1 is a schematic top plan view of a plurality of modular units arranged in rows and columns and equipped with at least one recess alongside each edge.
Figure 3:
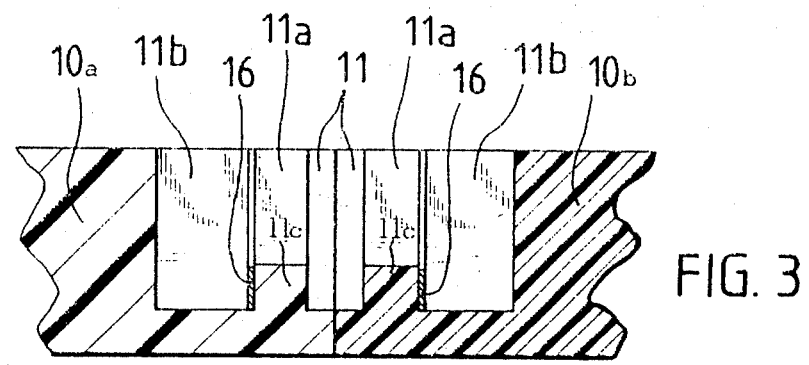
FIG. 3 is a sectional view, on an enlarged scale, along section line 3—3 in FIG. 1.

FIG. 1 shows an assembly of, for example, nine modular units 10 arranged in rows and columns and mutually interconnected by the system according to the invention. All modular units are of exactly the same construction. However, two units are referred to as 10a and 10b for convenience of description. Each modular unit is so constructed and arranged that it can be assembled with other modular units of the same type in almost any position and desired combination. Any number of modular units may be assembled to form a compact assembly. The interconnection is accomplished by a plurality of rapid clamping members 12, all of which are of the same construction, configuration, and dimension for the same type of modular units. Each modular unit is provided along its lateral edges with at least one recess means. Each recess means comprises three sections, namely a section 11 having a radius r and being located directly in the wall of the unit adjacent an edge and in parallel to an outer surface of the respective modular unit. A second section 11a is located further inwardly as best seen in FIG. 3. A third section 11b is located stillmore inwardly. The section 11a interconnects the sections 11 and 11b. The radial depth of the section 11a is smaller than the depth of the sections 11 and 11b to provide a clamping ring 11c, the inwardly facing ring surface of which is preferably covered with a washer 16 to be described in more detail below. As best seen in FIG. 1, all the recesses 11, 11a, 11b are located in the respective same positions relative to the modular units. Thus, when the modular units are assembled as shown in FIG. 1, the recesses are aligned with each other as shown. The recesses may be formed as part of the molding process when the modular units are manufactured, or these recesses may be provided by a subsequent machining or milling operation.

Figure 2:
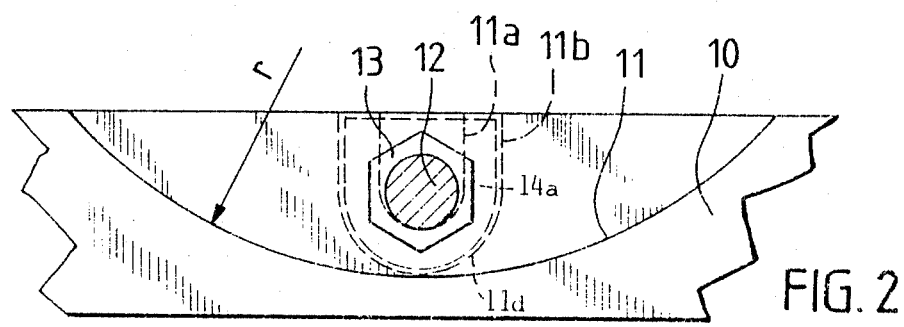
FIG. 2 is a view in the direction of the arrow A in FIG. 1, whereby the body of a rapid clamping member is shown in section without showing the tightening portion in section.
Figure 4:
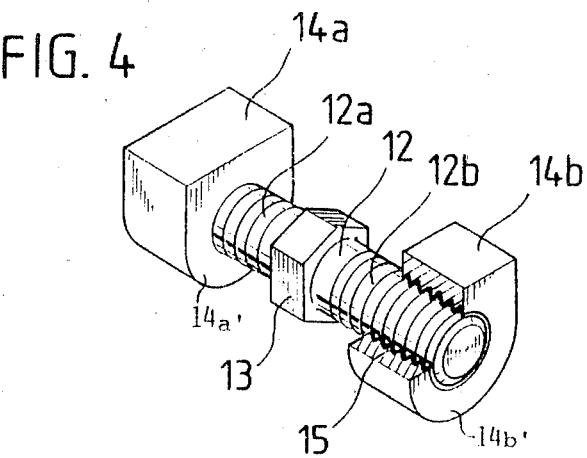
FIG. 4 is a perspective view of a rapid clamping device according to the invention cooperating with two nuts shaped for insertion into the recesses and showing a self-locking feature.

Referring to FIGS. 2, 3, and 4, the recess sections 11, 11a, and 11b are so shaped and dimensioned, that they are all standardized with regard to a respective shape of a rapid clamping device 12, 14a, 14b. Thus, the recesses of two neighboring modular units 10a and 10b are mirror-symmetrical to each other to provide the space required for a rapid clamping member and for two nuts received in the innermost recesses b. In other words, each set of recesses 11, 11a and 11b is so dimensioned with regard to the axial length and radial width, that it receives one-half of a rapid clamping member 12 and one respective nut 14a or 14b. The radial depth of the recesses 11 and 11b is the same in all instances and the depth of the recess 11a is somewhat less to provide the clamping ring 11c. The radius r shown in FIG. 2 is so selected that the recess 11 will permit the movements of a wrench required for tightening or loosening the rapid clamping member 12 having an intermediate section 13, for example, in the hexagonal configuration of a nut for cooperation with a respective wrench. The section 13 is rigidly secured to the members 12 and hence not a "nut" in the conventional sense of that term. However, in this context the section 13 will be referred to as the clamping nut 13.

Figure 5:
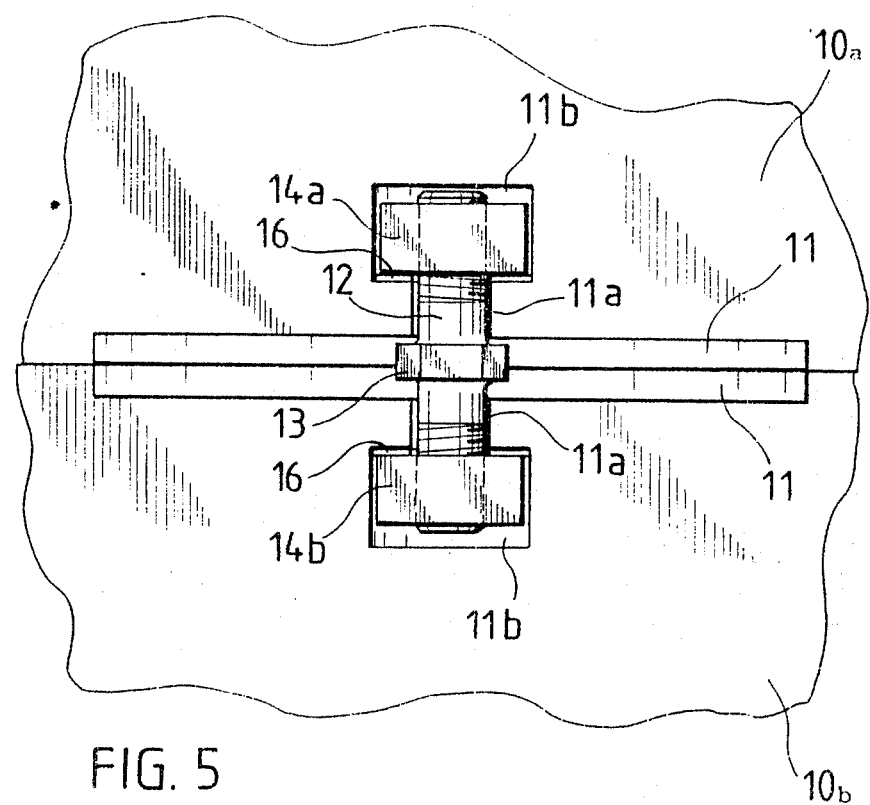
FIG. 5 is a top plan view in the same direction as FIG. 1, however, on an enlarged scale and showing the rapid clamping device in a clamping condition.

The perspective view of FIG. 4 shows the details of the rapid clamping device 12, 14a, 14b with its clamping nut 13 and its two end bolt portions 12a and 12b provided with threadings having opposite pitch directions so that rotation of the rapid clamping member 12 about its longitudinal axis in one direction will cause the two mounting nuts 14a and 14b received and held against rotation in the recesses 11b to move toward each other until the nuts 14a and 14b bear against the respective washer 16 as best seen in FIG. 5. Rotation of the clamping member 12 in the opposite direction will cause the nuts 14a and 14b to move away from each other, thereby loosening the connection.

Referring to FIG. 5, two modular units 10a and 10b are brought into alignment side to side with each other so that the respective recesses are also aligned with each other. A preassembled clamping device with its member 12 and nuts 14a 14b secured to the ends of the threaded portions 12a and 12b is now inserted into the recesses by simply dropping the preassembled rapid clamping device into the aligned recesses, whereby the nuts 14a and 14b are in such positions that they easily fit into the recesses 11b of both units 10a and 10b. The shank portions and possibly part of the threading of the member 12 rest in the recess sections 11a and is easily rotated in the required direction by applying a wrench to the clamping nut 13 until the nuts 14a and 14b bear against the washer 16. As mentioned, the recesses 11 have a sufficiently large radius r for turning the wrench in the required direction. If desired, an arrow with a respective marking may be applied to each modular unit alongside the recesses 11 for indicating to the operator in which direction the wrench has to be turned for tightening or loosening the rapid clamping connection. As shown in FIG. 4, a plastic insert 15 may be provided between the threaded portion of the member 12 and the respective nuts 14a and 14b to prevent a loosening of the rapid clamping connection, for example, if the assembly should be exposed to vibrations or impacts or the like. If substantial clamping forces are to be taken up by the ring portions 11c, the intermediate washers 16 should be made of a high wear resistant material such as steel, while the modular units themselves can still be made of a less expensive softer material such as synthetic materials or the like.

In view of the foregoing, it will be appreciated, that the assembly is very simple since the rapid clamping member 12 with both its nuts 14a and 14b can be tightened in a single operation by a single type of wrench. Thus, the assembly has been simplified and the time needed for assembling a given number of modular units has been reduced. Moreover, since each set of recesses takes up exactly one-half of the rapid clamping member 12 and only one nut of the two required nuts, the total space required for the connecting means is efficiently distributed to the several modular units which thus themselves can have an optimally small volume.

The recesses 11b have a curved bottom portion 11d shown by dashed lines in FIG. 2. The tying nuts 14a and 14b best seen in FIG. 4 each have a respectively curved portion 14a' and 14b' fitting into said curved bottom portion for centering the rapid clamping device in two sets of recesses which are axially aligned with each other prior to the insertion of the clamping device into the aligned recesses. The otherwise box-shaped configuration of the tying nuts 14a and 14b makes sure that these nuts cannot rotate in the respective recesses 11b when the member 12 is rotated by a wrench applied to the clamping nut 13.

The recesses 11, 11a, 11b are so dimensioned that they completely receive a clamping device 12, 14a, 14b as best seen in FIG. 2. Thus, the clamping device is fully recessed within the confines of the walls of two neighboring modular units. Please see also FIG. 1. This feature is an advantage because the clamping devices do not interfere with any stacking of assemblies of such modular units.

Although the invention has been described with reference to specific example embodiments, it will be appreciated, that it is intended to cover all modifications and equivalents within the scope of the appended claims.

What we claim is:

1. A mounting system for securing a plurality of modular units having side walls forming lateral edges, to one another, comprising rapid clamping means including a bolt having two free bolt ends and a tool engaging section between said two free bolt ends, said free bolt ends having oppositely directed threads thereon, and a tying nut on each free bolt end for tying neighboring modular units to each other, recess means in at least certain of said side walls next to said lateral edges of each modular unit, each recess means having a curved bottom portion, said recess means being located in such positions that the recess means of two neighboring aligned modular units match with each other to form a complete cavity with a configuration and dimensions for receiving one of said rapid clamping means, and wherein each of said tying nuts has a respectively curved portion fitting into said curved bottom portion of said recess means for centering said rapid clamping means in said recess means.

2. The system of claim 1, wherein each of said recess means is an approximately mirror-symmetrical image of any other of said recess means, so that each recess means has an axial dimension corresponding approximately to one-half of an axial dimension of said rapid clamping means, each recess means further having dimensions perpendicularly to said axial dimension, corresponding approximately to respective dimensions of said rapid clamping means.

3. The system of claim 1, wherein each of said tying nuts has a configuration that prevents rotation of the tying nuts in the respective recess means.

4. The system of claim 1, wherein each recess means has, next to a respective side wall, a recess section having a configuration of a segment with a radius sufficient for permitting a tool movement for actuating said rapid clamping means.

5. The system of claim 1, wherein said recess means comprise two cavity sections of given depth in a radial direction perpendicularly to an axial direction and a third cavity section between said two cavity sections, said third cavity section having a radial depth smaller than said given depth for forming a clamping ring between said two cavity sections, said system further comprising washer means of wear resistant material on said clamping ring, said washer means facing said rapid clamping means.

6. The system of claim 1, wherein at least one of said tying nuts comprises self-locking means for stopping an undesired rotation of said tying nut.

7. The system of claim 1, wherein at least one of said threaded bolts comprises self-locking means for stopping an undesired rotation of said tying nut.

* * * * *